United States Patent [19]

Raue

[11] Patent Number: 5,099,720
[45] Date of Patent: Mar. 31, 1992

[54] CONTROL MECHANISM FOR AN AUTOMATIC GEAR-SHIFTING TRANSMISSION USING TURN SIGNAL CONTROL UNIT

[75] Inventor: Reimund Raue, Friedrichshafen, Fed. Rep. of Germany

[73] Assignee: Zahnradfabrik Friedrichshafen AG, Fed. Rep. of Germany

[21] Appl. No.: 397,473
[22] PCT Filed: Feb. 12, 1988
[86] PCT No.: PCT/EP88/00112
  § 371 Date: Aug. 16, 1989
  § 102(e) Date: Aug. 16, 1989
[87] PCT Pub. No.: WO88/06540
  PCT Pub. Date: Sep. 7, 1988

[30] Foreign Application Priority Data

Feb. 26, 1987 [DE] Fed. Rep. of Germany ....... 3706179
Apr. 15, 1987 [DE] Fed. Rep. of Germany ..... 37712808

[51] Int. Cl.$^5$ .................. F16H 61/02; F16H 59/12; H01H 3/16
[52] U.S. Cl. ......................... 74/866; 74/878; 74/473 SW; 74/484 R; 200/61.27
[58] Field of Search .......... 74/861, 878, 866, 473 SW, 74/484 R; 200/61.27, 61.28, 61.54

[56] References Cited

U.S. PATENT DOCUMENTS

| 3,544,743 | 1/1950 | Takei | 200/61.54 |
|---|---|---|---|
| 4,293,743 | 10/1981 | Iwata et al. | 200/61.54 |
| 4,414,863 | 11/1983 | Heino | 74/861 X |
| 4,503,300 | 3/1985 | Lane, Jr. | 74/484 R X |
| 4,649,768 | 3/1987 | Kusaka et al. | 74/473 SW |
| 4,669,335 | 6/1987 | Matsuoka et al. | 74/866 |
| 4,692,866 | 9/1987 | Kosuge | 74/866 X |
| 4,693,142 | 9/1987 | Kurihara et al. | 74/861 |
| 4,815,341 | 3/1989 | Ohkubo et al. | 74/866 X |
| 4,829,852 | 5/1989 | Sakakiyama | 74/878 X |
| 4,846,020 | 7/1989 | Kondo et al. | 74/866 |
| 4,846,022 | 7/1989 | Ito et al. | 74/878 X |
| 4,926,328 | 5/1990 | Funatsu et al. | 74/866 X |
| 4,941,372 | 7/1990 | Aoki et al. | 74/878 |
| 5,023,592 | 6/1991 | Schumadrer | 200/61.27 X |

Primary Examiner—Allan D. Herrmann
Assistant Examiner—Khoi Q. Ta
Attorney, Agent, or Firm—Davis, Bujold & Streck

[57] ABSTRACT

A control mechanism for an automatic transmission (1) of a motor vehicle including one electronic control unit (2) for determining the shift points for the change of gear. The latter results at least from the information from the vehicle speed (3) and the required load (4). The shift points are overridden by orders issued by the adjusting means needed for operation of the vehicle. A flasher unit (6) known per se for indicating the direction of travel is additionally connected via a line (61) with the electronic control unit (2) and via a flash-unit signal the generally known determination of the shift point is overridden either by an immediate downshift by at least one gear or a control of the downshift and upshift points in the sense of increasing them. The activity of the flash-unit signal can remain limited to the higher gears of an automatic transmission. The signal from the flasher unit (6) also overrides all eventually selected programs (such as economic program) and can also suppress intended upshifts.

14 Claims, 2 Drawing Sheets

CONTROL MECHANISM FOR AN AUTOMATIC GEAR-SHIFTING TRANSMISSION USING TURN SIGNAL CONTROL UNIT

The invention relates to a control mechanism for an automatic gear-shifting transmission of a motor vehicle according to the preamble of claim 1.

Such a control mechanism has been disclosed in ATZ 85 (1983) 6 from the publications "Development of the 4-Gear Automatic Transmission 4 HP 22 of ZF (Dach)", page 393, and "Use of 4-Gear Automatic Transmissions with Electronic-Hydraulic Control (Lorenz/Larisch)", page 411. In the electronic-hydraulic control mechanisms here described, it is possible to take control of the gear shift of the transmission via a full-power actuator (kick-down). The driver can in this manner effect a downshift, for instance, to obtain the acceleration needed for an overtaking operation.

In addition it has been disclosed in EP-A1 01 44 608 to take into consideration transverse acceleration for control of the shift point.

It has also been disclosed in DE-OS 36 26 100 to use the steering angle on the control column in a control mechanism for an automatic transmission of an industrial vehicle to determine a signal for better control of the automatic changes. Depending on the steering angle and its magnitude, there takes place, according to this prior art, a downshift by one or more gears.

It is true that all these solutions improve the adaptation of the gearshift of an automatic transmission when cornering or overtaking. But the gearshift occurs very late and the devices for determining the information for the control are, in addition, relatively expensive.

Accordingly, an object of the invention is to improve a control mechanism according to the preamble of claim 1. The automatic gearshift can by the invention become still better adapted to the traffic situation, when cornering and overtaking by the simplest possible means.

This problem is solved by the features characterized in claim 1.

The automatic transmissions known already shift to the highest gear at medium speeds and lower power requirements. In these conditions the acceleration potential available is low. The driver wishing to overtake a vehicle running in front of him remains in the same condition until the traffic situation allows him to overtake. Only then do appear the control signals for control of the transmission, which are derived from the power requirement, the steering angle, or the transverse acceleration. After the signals have been processed, the transmission and the engine shift with acceleration to the higher speed. In the meantime, valuable time has been lost for overtaking. If the driver here actuates the kick-down, he has at his disposal the maximum available power and this is only required in emergencies. Customary overtaking operations should not constitute emergency cases. If the original position of the gas pedal is reassumed, the transmission undesirably upshifts while overtaking. The same occurs when other control signals cannot be retained during the whole overtaking operation.

In contrast with the above, in the control mechanism according to the invention there is utilized a control signal which corresponds to the intention of the driver resulting from the existing traffic situation. Before the driver starts to overtake, he is obliged promptly to indicate to the traffic behind him his change of direction by actuating the directional indicators. The control mechanism according to the invention makes use of this actuation for control purposes by shifting the vehicle drive to a condition for higher power or acceleration reserves before power is actually required by operation of the gas pedal. With the available accelerating, the driver can now utilize the power reserve in accordance with the traffic situation without unexpectedly falling back in an unfavorable power range or damaging the engine while overtaking. Besides, there results a harmonious transition to the kick-down position. It is further possible, when turning off at intersections, to effect a downshift for a fluent travel by means of actuation of the direction indicators, without it being necessary to actuate the selector lever to obtain a downshift. If on account of overtaking, cornering, or driving in an intersection on which he must turn off, the driver's foot leaves the gas pedal, then the automatic transmission introduces an upshift. This can be avoided by a prompt actuation of the direction indicators so that too high a shifting frequency is prevented. If the driver again gives gas for overtaking or cornering, then the automatics must downshift just before the driver obtains the required power. By preventing an upshift and/or obtaining a downshift as a result of the mere actuation of the direction indicators, it is possible to prevent loss of time and disturbances in traveling comfort, and to obtain greater safety.

The arrangement of features of the invention according to the sub-claims, which is well-adapted to the practical requirements, offers further advantages. Thus, in a direction indicating unit (turn signal control unit) without automatic resetting, the control of the electronic unit can be prolonged past the time the direction indicating unit is actuated. The change from a power-oriented program to an economic program can take place according to a defined time starting from the resetting, but also according to the power requirement, for instance, below a defined position of the gas pedal. In this manner it is possible, for instance, optimally to effect overtaking operations on the interstate highway up to re-shifting without the need of contacts on the selector lever and/or console-mounted selectors. If control of the electronics in the form of a gear downshift or change of program is not desired, as when overtaking in the presence of a calm traffic situation, it is possible to actuate only the direction indicators by tapping or by a first switch connected with a first movement in the existing direction, since the electronic determination of the shift point is overridden only with a larger movement via a second switch. This can even be obtained with a simple direction indicator switch when a time element is placed in the electronic control unit and the period of time of engagement is measured, and when only after the lapse of a predetermined period of time the determination of the shift point is overridden. For ascents it is advantageous to situate the switch for activating the control of the shift point and specially for changing the programs—economy, power—on the direction indicator lever or the proximity thereof, but it is not essential to combine the actuation with the activation of direction indicators. Thus, it is possible to select the programs not merely for a certain duration of travel—as formerly with the switch on the console—but to integrate the shift programs stored in the electronics and therewith the shift points in upshifts and downshifts which are coordinated with said shift programs, for a fluent, safe and also economical mode of travel continuously using an automatic transmission.

The invention is not limited to the combination of features of the claims. Other possible logical combinations result for the expert from the claims and individual features thereof according to the stated problem.

Other details of the invention are explained with reference to drawings and to an embodiment. In the drawings.

Figure 1:
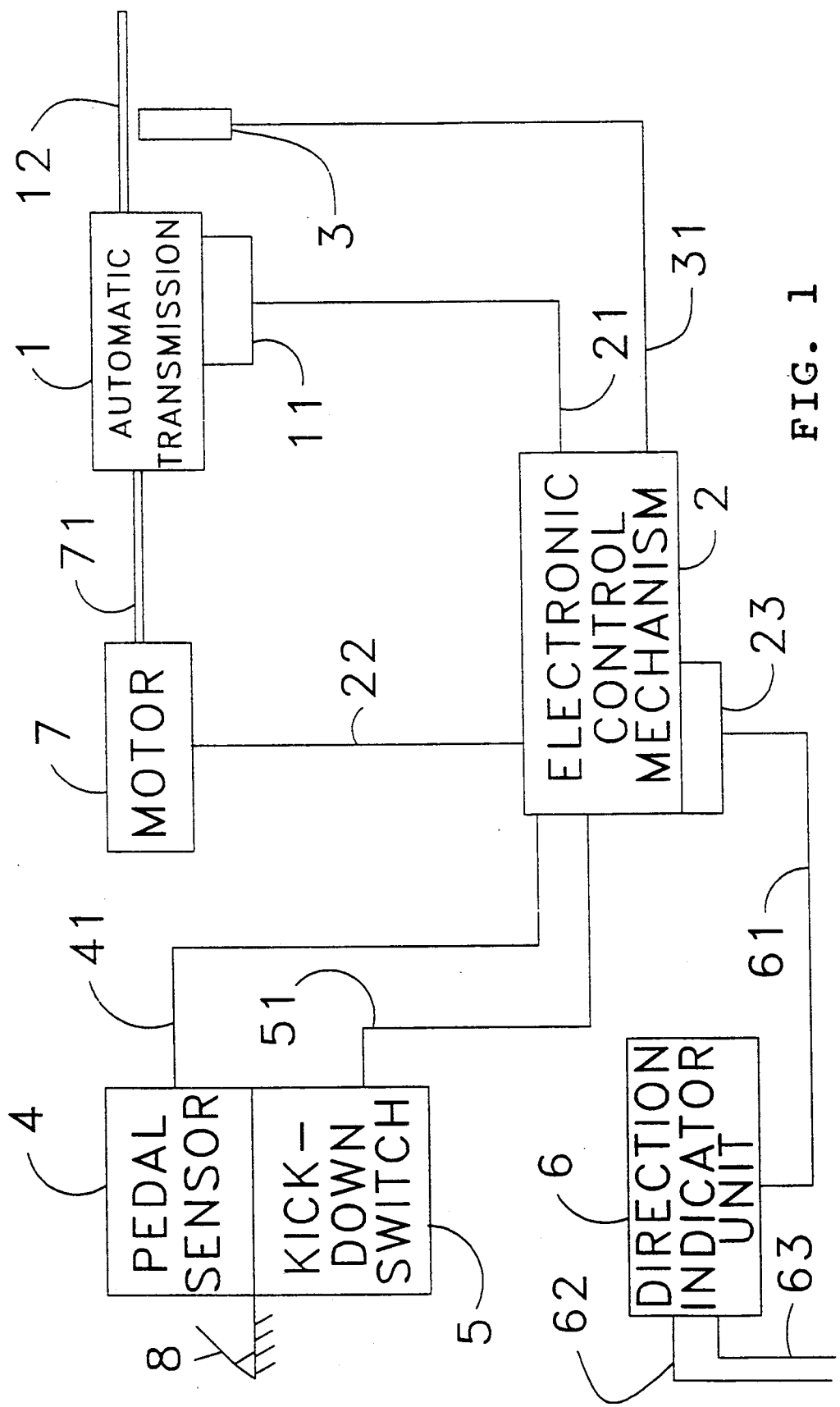
FIG. 1 is a block schematic of a control mechanism for an automatic transmission.

The automatic transmission designated by 1 in the drawings can be both a hydrodynamic-mechanic transmission such as with torque converter and a planetary gear and an automated countershaft transmission constructed as clutch-transmission unit. Information is fed to the electronic control unit 2, at least for determining the shift point for the automatic transmission 1, via a vehicle speed sensor 3, an accelerator pedal sensor 4, a kickdown switch 5 and the direction indicator unit 6. For this purpose the unit 6 has also a line 61 which connects it with the electronic control unit 2. In a manner known per se the lines 62, 63 lead to the direction indicator lights for indicating change in the direction of travel. The gear shift orders are passed via the line 21, for instance, to the magnetic shift valve 11 of the automatic transmission 1. The change of gear can take place in a manner known per se electro-dynamically and also purely electronically. The electronic control mechanism 2 is also connected via the line 22 with the engine such as for control of the engine during the shifting operation. An electronic unit, a so-called electronic gas device, also can be situated between the accelerator pedal sensor 4 and the engine. The transmission output shaft is designated by 12 and the engine output shaft by 71. The accelerator pedal sensor 4 and the kickdown switch 5 are situated for operation by the accelerator pedal 8. By a timing element 23 in the electronic control unit 2, it is possible to use the signal from the direction indicator unit 6 via the line 61 to control the determination of the shift point only after the direction indicator unit signal has been received for a fixed duration of time. Therefore, a relatively brief tap of the unit 6 leads in a manner known per se only to the actuation of the direction indicator lights, not shown.

Figure 2:
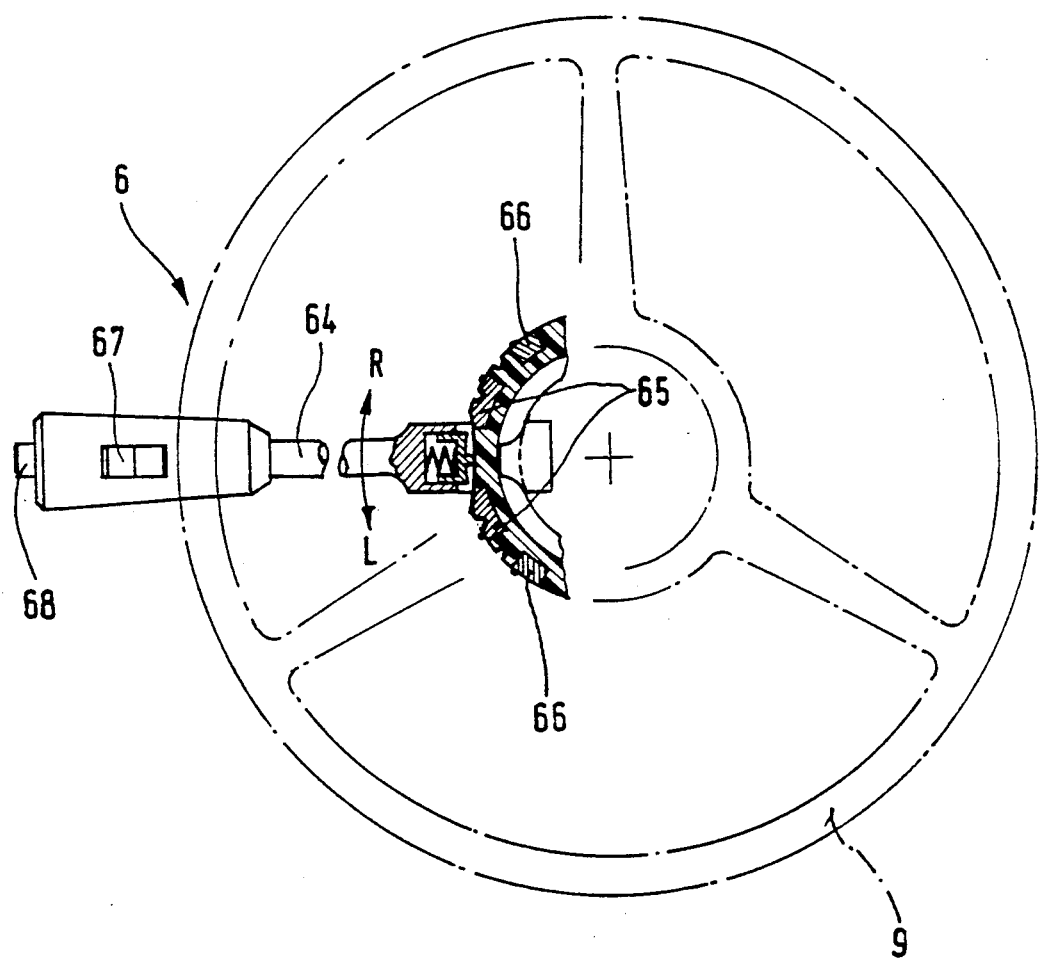
FIG. 2 is a direction indicating unit in the area of the steering wheel.

According to FIG. 2 the flash unit 6 is placed in the area of a steering wheel 9. The direction indicator lights for the change of travel direction are activated in a manner known per se with the turn signal control lever 64—tapping and engaging or locking of the switch 65. In each of the two directions—turn left L, turn right R—there can be additionally situated a second switch 66, which can be actuated along when the turn signal control lever 64 tilts. There can also be alternatively placed, for instance, on the turn signal control lever 64, switches 67, 68 to be separately actuated.

The control mechanism operates as follows: The shift points for the gear shift device—such as the magnetic valves 11 of the automatic transmission 1—are determined and shifted according to the speed of the vehicle at least from the information of the vehicle—sensor 3—which is derived from the speed of the output shaft 12 of the automatic transmission 1 and from the load requirement derived, for instance, from the accelerator pedal sensor 4. For determining the shift points there can also be used, for instance, the acceleration which is obtained, for instance, from an acceleration sensor but also from an acceleration computation in the electronic control mechanism 2. By actuating the accelerator pedal 8 up to the final position, it is possible to override the general shift point determination so that an order of downshifting by one gear is issued via the kick-down switch 5 in the electronic control unit 2 when this is permitted. This is determined by the engine speed which is mathematically determined in the electronic unit 2. But the speed of the engine can also be measured via a sensor, not shown, on the engine output shaft 71. The parameters for determining the shift points and the shift orders themselves are derived from the travel situation precisely existing at the time—travel speed, position of the accelerator pedal—or also from the acceleration determined. With the signal from the unit 6 via the line 61 to the electronic control unit 2, there is used for the first time, for determining the shift point, a signal that corresponds to an impending travel situation. It can be used for immediate downshift by at least one gear when said downshift is admissible. But the known determination of the shift point can be overridden so that, for instance, the speed-dependent downshift point becomes remarkably high in order that a power-optimated travel be possible. Both possible solutions are specially significant in electronic controls for automatic transmissions with selectable programs such as for an economical or power-oriented mode of travel without there being required for obtaining the necessary safety to shift, for instance, from the economic to the power program. It is also conceivable to limit in time the overriding of the determined shift point which is obtained via the unit 6, or to extend it beyond the duration of the actuated turn signal control lever in order that said overriding does not act over the whole duration of the unit 6, or that it be possible to extend the time of the overriding in case of a quick automatic resetting of the unit 6. It can also remain limited to the area of the high gears of an automatic transmission, since at the time of starting or in the area of the lower gears, there is no increase in the safety of travel by a premature downshift such as in an overtaking operation. But by the signal from the unit 6 to the electronic control device 2, there can also be prevented other usual upshifts such as in an impending overtaking operation when a vehicle, with or without a slight actuation of the accelerator pedal 4, travels behind a relatively slow vehicle and the oncoming traffic has to be watched.

If the unit 6 has two consecutive shift positions for both travel and bend off directions—tapped without stop-over position and arrested or actuated—then it is possible to provide the first tapped position without, and the second arrested position with, shift point relocation or downshift. Accordingly, two switches 65, 66 for each travel direction, or at least one contact and one switch, are needed in the turn signal control unit 6 for each gearshift position. If two switches are used, then it is possible both to actuate the second switch 66 for control of the electronic control 2 simultaneously with the flash-unit lever 64 or to provide an additional actuation such as via a tumbler switch 67 or push-button switch 68 placed on the turn signal control lever 64 or in the proximity thereof.

In another embodiment of the invention it is also conceivable to effect the conversion from a shift program to another program such as from a utility—(economy) and comfort—oriented program to a power-oriented program with a turn signal control lever 64 and also with a separate switch 67, 68 on, or in the proximity of, the turn signal control lever 64 and also with a separate switch 67, 68 on, or in the proximity of, the turn signal control lever 64. The control mechanism according to the invention is also for transmissions having only partly automated gears such as an automated overdrive.

REFERENCE NUMERALS 1 automatically gear-shifting transmission/automatic transmission
12 transmission output shaft
2 electronic control unit
21 line
22 line
23 timer element
3 road speed sensor
31 line
4 accelerator pedal sensor
41 line
5 kick-down switch
51 line
6 turn signal control unit
61 line
62 line
63 line
64 turn signal control lever
65 switch
66 switch
67 switch
68 switch
7 engine
71 engine output shaft
8 accelerator pedal
9 steering wheel
L left
R right

I claim:

1. A control mechanism for an automatic gear-shifting transmission (1) of a motor vehicle comprising an electronic control unit (2), for determining a shift point for changing from one gear to another gear, receiving at least speed (sensor 3) and load requirement (accelerator pedal sensor 4) inputs of the vehicle, in which a general determination of the shift point in a forward travel direction is overridden by an order issued via an adjusting device (5) needed for operation of the vehicle, wherein a turn signal control unit (6), for indicating a turn direction of the vehicle, is electrically connected with said electronic control unit (2) and actuation of said turn signal control unit produces a signal, sent to said electronic control unit (2), that also overrides the general determination of the shift point.

2. A control mechanism according to claim 1, wherein the speed of at least one of the down and up shift points of a shift is increased, according to the inputs of the speed of the vehicle (sensor 3) and the load requirement (accelerator pedal sensor 4), when the signal from said turn signal control unit is received by said electronic control unit (2).

3. A control mechanism according to claim 2 and to a program selector, wherein at least one of an economy program and a comfort operating program is overridden by a power program for a duration of time during which the signal from said turn signal control unit is received by said electronic control unit (2).

4. A control mechanism according to claim 2 and to a program selector, wherein at least one of an economy and a comfort operating program is overridden by a power program for a duration of time during which the signal from said turn signal control unit is received by said electronic control unit (2) plus a predetermined period of time thereafter.

5. A control mechanism according to claim 2 and to a program selector, wherein at least one of an economy and a comfort operating program is overridden by a power program for a duration of time during which the signal from said turn signal control unit is received by said electronic control unit (2) plus a defined period of time.

6. A control mechanism according to claim 2, wherein the increased speed for a shift point approaches a permissible maximum speed for the vehicle engine (7).

7. A control mechanism according to claim 1, wherein when the transmission is operating in a higher gear a downshift by at least one gear takes place, via said electronic control unit, upon receiving the signal from said turn signal control unit.

8. A control mechanism according to claim 1, wherein an upshift, which may normally occur during operation of the vehicle, is prevented when the signal from said turn signal control unit (6) is received by said electronic control unit (2).

9. A control mechanism according to claim 1, wherein a timer element (23) is connected to said electronic control unit (2) to receive the signal from the turn signal control unit and the general determination of a shift point is overridden by said electronic control unit (2) only after the timing element (23) receives the signal for a predetermined period of time.

10. A control mechanism according to claim 1, wherein the turn signal control unit has a lever having a central neutral position and an intermediate and an end position on both sides of the neutral position, the lever being operable in a single plane to actuate both of the intermediate and the end positions, wherein when the lever is in one of the end positions a turn signal is generated along with the signal for overriding the general determination of a shift point and when the lever is in one of the intermediate positions only a turn signal is generated.

11. A control mechanism according to claim 10, wherein said turn signal control unit (6) has an additional separate switch (66), for generating the signal for overriding the general determination of a shift point, which is actuated upon actuation of said turn signal control unit (64).

12. A control mechanism according to claim 10, wherein said turn signal control unit (6) includes a separate switch (67, 68), for generating the signal for overriding the general determination of a shift point, which can be actuated upon actuating said turn signal control unit 64.

13. A control mechanism according to claim 10, wherein said turn signal control unit (6) includes a separate switch (67, 68), for generating the signal for overriding the general determination of a shift point, which can be actuated separately.

14. A control mechanism according to claim 3, wherein a separate switch (67, 68) is attached to said turn signal control unit (64) for changing to one of an economy program, a comfort program, and a power-oriented program.

* * * * *